(12) United States Patent
Chen (10) Patent No.: US 8,157,021 B2
(45) Date of Patent: Apr. 17, 2012

(54) CHISEL ADAPTER

(76) Inventor: Bo-Shen Chen, Taichung County (TW)

( * ) Notice: Subject to any disclaimer, the term of this patent is extended or adjusted under 35 U.S.C. 154(b) by 315 days.

(21) Appl. No.: 12/626,899

(22) Filed: Nov. 29, 2009

(65) Prior Publication Data

US 2011/0127054 A1    Jun. 2, 2011

(51) Int. Cl.
*B25B 13/46* (2006.01)
*E02D 7/02* (2006.01)
*E21B 3/00* (2006.01)
*E21B 17/22* (2006.01)
*E21B 19/16* (2006.01)
*E21B 19/18* (2006.01)

(52) U.S. Cl. ............................................. 173/29; 173/48
(58) Field of Classification Search ............. 173/29, 173/48, 217; 74/337
See application file for complete search history.

(56) References Cited

U.S. PATENT DOCUMENTS

| | | | | |
|---|---|---|---|---|
| 2,990,187 | A * | 6/1961 | Amundsen et al. | 279/19.5 |
| 4,111,060 | A * | 9/1978 | Nerini | 74/56 |
| 4,450,919 | A * | 5/1984 | Cousineau | 173/29 |
| 4,489,792 | A * | 12/1984 | Fahim et al. | 173/48 |
| 6,684,964 | B2 * | 2/2004 | Ha | 173/29 |
| 7,588,093 | B2 * | 9/2009 | Grand et al. | 173/29 |
| 7,597,155 | B2 * | 10/2009 | Ullrich et al. | 173/29 |
| 7,874,378 | B2 * | 1/2011 | Chen | 173/29 |

* cited by examiner

*Primary Examiner* — Lindsay Low (57) ABSTRACT

A chisel adapter has both ends connected with a tool head and a drive tool, respectively, and comprises: a first sleeve, a slide bushing, a first fastener, an abutting member, a second sleeve, a first rod, and a second rod. The chisel adapter is convenient to use since it allows the user to replace the chisel by hand without using tools. Furthermore, the chisel adapter is improved in applicability since it is applicable to common drive tools.

7 Claims, 8 Drawing Sheets

CHISEL ADAPTER

BACKGROUND OF THE INVENTION

1. Field of the Invention

The present invention relates to an adapter structure, and more particularly to a chisel adapter.

2. Description of the Prior Art

TW Pat. No. 538876 discloses a chisel fixing device which has a fixing end inserted out of a hole of a sleeve and pressed tightly against the top surface of a receiving chamber of an extendible pipe. When a piston drives an impact rod to move in the extendible pipe, the top surface of the receiving chamber of the extendible pipe will directly impact the fixing end of the chisel to produce impacting force, thus preventing the positioning pins from getting loose. Furthermore, the positioning pins are received in the receiving chamber of the extendible pipe, which prevents the disengagement of the positioning pins. However, this conventional chisel fixing device still has the following disadvantages.

First, it still uses the positioning pins to fix the chisel, the fixing effect won't be good, furthermore, the positioning pins requires the use of tools, which results in inconvenience when replacing the chisel.

Second, when the chisel fixing device is fixed to a drive tool, to make the chisel produce impacting force, the drive tool must be provided with the piston and impact rod, however, the drive tool equipped with piston and impact rod is a tool with special specification, as a result, the chisel fixing device cannot be applicable to common drive tools.

The present invention has arisen to mitigate and/or obviate the afore-described disadvantages.

SUMMARY OF THE INVENTION

The primary object of the present invention is to provide a convenient-to-use chisel adapter which allows the user to replace the chisel by hand without using tools, Another object of the present invention is to provide a chisel adapter with improved applicability, which is applicable to common drive tools.

A chisel adapter in accordance with the present invention has both ends connected with a tool head and a drive tool, respectively, and comprises: a first sleeve, a slide bushing, a first fastener, an abutting member, a second sleeve, a first rod, and a second rod. The first sleeve is axially provided on its outer surface with a first annular portion and a second annular portion with a larger diameter than the first annular portion, the first sleeve is defined with a first engaging hole and a second engaging hole which are in communication with each other and penetrate through the first sleeve, and between the first and second engaging holes is formed an annular flange, the first annular portion is formed with three ball-receiving holes in communication with the first engaging hole, and in each of the ball-receiving holes is received a movable ball. The slide bushing is interiorly provided with a first annular flange, a second annular flange, and an annular groove formed between the first and second annular flanges, the slide bushing is movably mounted on the first annular portion of the first sleeve to define a space between the second annular flange and the second annular portion, and in the space is disposed a first spring, under normal conditions, the second annular flange is pushed against the respective balls to make them partially protrude out of the ball-receiving holes and into the first engaging hole, when the slide bushing slides to a position where the annular groove is aligned with the ball-receiving holes, the balls won't protrude into the first engaging hole any longer. The first fastener is disposed in the first annular portion of the first sleeve and abutted against an outer surface of the first annular flange of the slide bushing. The abutting member includes a rod portion and an abutting portion with a larger diameter than the rod portion, the abutting portion is inserted in the first engaging hole of the first sleeve, and a second spring is biased between the abutting portion and the annular flange of the first sleeve, the rod portion is inserted in the second engaging hole and partially extended therefrom in such a manner that a part of the rod portion extending out of the second engaging hole is provided with a second fastener which is abutted against the annular flange of the first sleeve. The second sleeve is formed with a cavity and a hexagonal inserting hole at a bottom of the cavity. The first rod includes a first body portion with a hexagonal cross section and a first head portion with a larger diameter than the first body portion, at an end surface of the first head portion are formed a plurality of first teeth, the first rod is axially movably inserted in the second sleeve in such a manner that between the first head portion and the bottom of the cavity is disposed a third spring, the first body portion being inserted in the inserting hole of the second sleeve and the second engaging hole of the first sleeve. The second rod includes a second body portion and a second head portion, at an end surface of the second head portion are formed a plurality of second teeth, the second rod is pivotally disposed in the cavity of the second sleeve in such a manner that the second teeth of the second rod are engaged with the first teeth of the first rod, by rotating the second rod, the second teeth of the second rod will axially push the first teeth of the first rod, making the first rod move axially back and forth in the second sleeve.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Referring to FIGS. 1-4, a chisel adapter in accordance with the present invention has two ends connected with a tool head (chisel) 35 and a drive tool 36, respectively, and comprises: a first sleeve 10, a slide bushing 20, a first fastener 31, an abutting member 40, a second sleeve 50, a first rod 60 and a second rod 70.

The first sleeve 10 is axially provided on its outer surface with a first annular portion 11 and a second annular portion 12 which is larger in diameter than the first annular portion 11. The first sleeve 10 is defined with a first engaging hole 13 and a second engaging hole 14 which are in communication with each other and penetrate through the first sleeve 10, and between the first and second engaging holes 13, 14 is formed an annular flange 15. The first annular portion 11 is formed with three ball-receiving holes 111 in communication with the first engaging hole 13, and in each of the ball-receiving holes 111 is received a movable ball 16 which is capable of selectively protruding out of the ball-receiving holes 111. Furthermore, an annular groove 112 is formed around the outer surface of the first annular portion 11, the second annular portion 12 is formed with a threaded hole 121 in communication with the second engaging hole 14, and in the threaded hole 121 is screwed a screw 17.

The slide bushing 20 is interiorly provided with a first annular flange 21, a second annular flange 22, and an annular groove 23 formed between the first and second annular flanges 21, 22. The slide bushing 20 is movably mounted on the first annular portion 11 of the first sleeve 10 to define a space 25 between the second annular flange 22 and the second annular portion 12, and in the space 25 is disposed a first spring 24 with two ends 241 and 242 pressed against the end surfaces of the second annular flange 22 and the second annular portion 12, respectively, to push the slide bushing 20 back to its original position after it slides toward the second annular portion 12. Under normal conditions, the second annular flange 22 is pushed against the respective balls 16 to make them partially protrude out of the ball-receiving holes 111 and into the first engaging hole 13. When the slide bushing 20 slides to the position where the annular groove 23 is aligned with the ball-receiving holes 111, the balls 16 won't protrude into the first engaging hole 13 any longer.

The first fastener 31 is disposed in the annular groove 112 of the first annular portion 11 of the first sleeve 10, and under normal conditions, the first fastener 31 is abutted against the outer surface of the first annular flange 21 of the slide bushing 20 to prevent the slide bushing 20 and the first sleeve 10 from disengaging from each other.

The abutting member 40 includes a rod portion 41 and an abutting portion 42 which is larger in diameter than the rod portion 41. The abutting portion 42 is inserted in the first engaging hole 13 of the first sleeve 10, and a second spring 43 has two ends 431 and 432 abutted against the end surfaces of the abutting portion 42 and the annular flange 15, respectively. The rod portion 41 is inserted in the second engaging hole 14 and partially extends therefrom in such a manner that the part of the rod portion 41 extending out of the second engaging hole 14 is annularly formed with a groove 411 for engaging with a second fastener 32, and the second fastener 32 is abutted against another end surface of the annular flange 15, so as to prevent the abutting member 40 from disengaging from the first sleeve 10.

The second sleeve 50 is formed with a cavity 51 at a bottom 511 of which being defined a hexagonal inserting hole 512, and adjacent to the entrance of the cavity 51 is formed a threaded section 513.

The first rod 60 includes a first body portion 61 which is hexagonal-shaped in cross section and a first head portion 62 which is larger in diameter than the first body portion 61. At an end surface 621 of the first head portion 62 are formed three first teeth 622 protruding in the axial direction of the first rod 60, and each two neighboring first teeth 622 define a first concave portion 623 therebetween. Each first tooth 622 includes a first abutting surface 622a and two first guiding surfaces 622b which are connected to the first abutting surface 622a and the end surface 621 of the first head portion 62 in an inclined manner. The first rod 60 is axially movably inserted in the cavity 51 of the second sleeve 50 in such a manner that between the first head portion 62 and the bottom 511 of the cavity 51 is disposed a third spring 63, the first body portion 61 is inserted in the inserting hole 512, so that the first rod 60 is only movable along the axial direction of the second sleeve 50 but unable able to rotate with respect to the second sleeve 50. Meanwhile, the first rod 60 is also inserted in the second engaging hole 14 of the first sleeve 10 and fixed therein by the screw 17.

The second rod 70 includes a second body portion 71 and a second head portion 72. The second body portion 71 includes a connecting section 711 which is round-shaped in cross section and an inserting section 712 which is hexagonal in cross section. The inserting section 712 is formed with an engaging groove 712a to be clamped by a driving tool. At an end surface 721 of the second head portion 72 are formed three second teeth 722 protruding in the axial direction of the second rod 70, and each two neighboring second teeth 722 define a second concave portion 723 therebetween. Each second tooth 722 includes a second abutting surface 722a and two second guiding surfaces 722b which are connected to the second abutting surface 722a and the end surface 721 of the second head portion 72 in an inclined manner. The second rod 70 is pivotally disposed in the cavity 51 of the second sleeve 50 in such a manner that a bearing 73 is arranged between the connecting section 711 of the second body portion 71 and the cavity 51 of the second sleeve 50, the second teeth 722 are engaged with the first teeth 622 of the first rod 60, and the second guiding surfaces 722b abut against the first guiding surfaces 622b. By rotating the second rod 70, its second teeth 722 will axially push the first teeth 622, making the first rod 60 move axially back and forth in the second sleeve 50. Moreover, a stop member 52 is screwed with the threaded section 513 in the cavity 51 of the second sleeve 50 to prevent the bearing from disengaging from the second sleeve 50.

For a better understanding of the operation and function of the present invention, reference should be made to the description set forth below.

Figure 5:
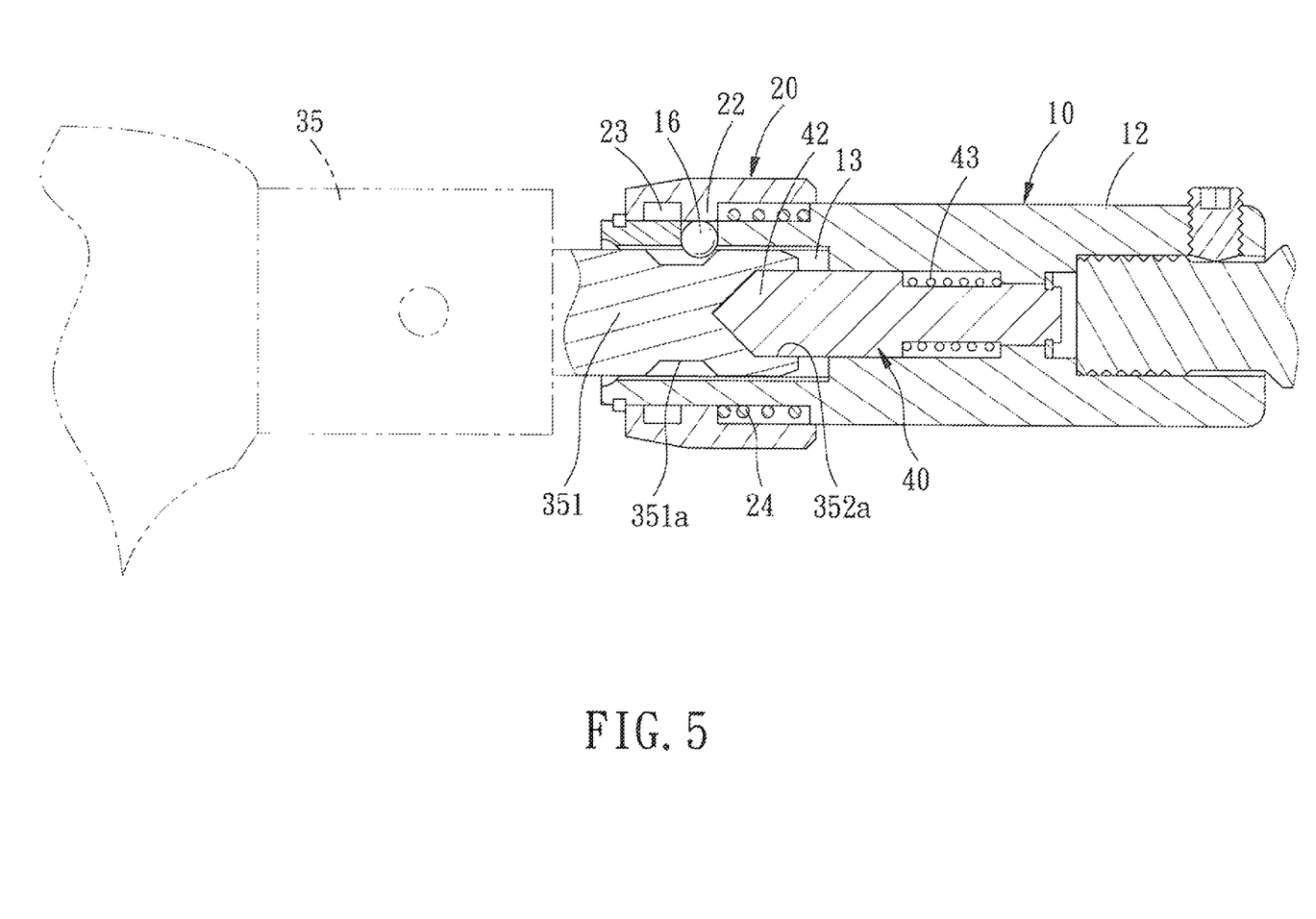
FIG. 5 is an operational view of the present invention showing that the chisel is positioned in the first sleeve.
Figure 6:
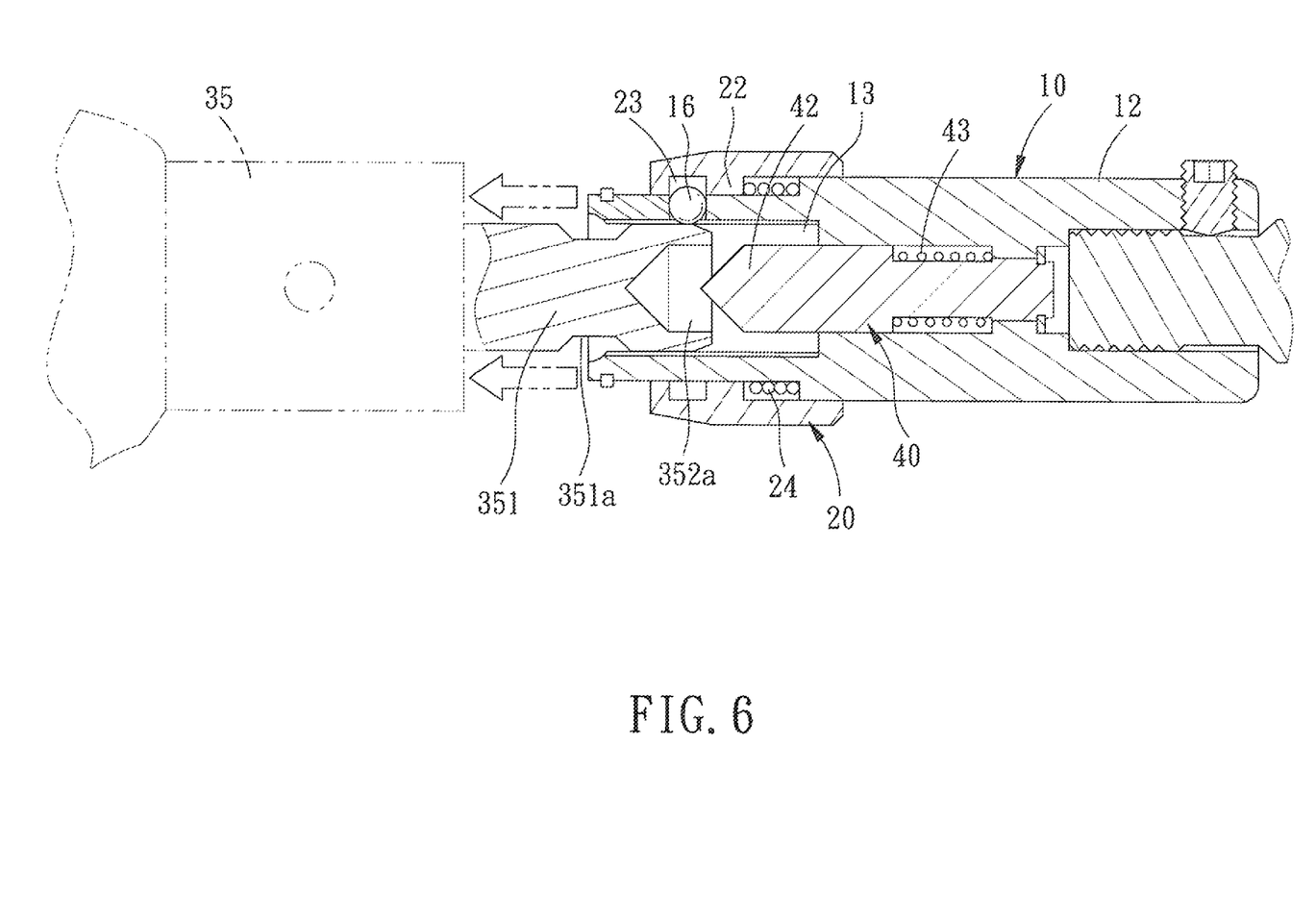
FIG. 6 is an illustrative view of the present invention showing that the slide bushing is pushed away from the chisel.

To replace the chisel, as shown in FIGS. 5 and 6, the slide bushing 20 can be pulled toward the second annular portion 12 of the first sleeve 10 to make the balls 16 partially protrude into the annular groove 23 without being pushed against by the second annular flange 22, namely, the balls 16 won't protrude into the first engaging hole 13 and engage with the annular positioning groove 351a in the handle portion 351 of the chisel 35 anymore. At this moment, the chisel 35 can be taken out of the first engaging hole 13 of the first sleeve 10 and replaced with a new chisel in such a manner that the handle portion of the new chisel is inserted in the first engaging hole 13 of the first sleeve 10 until the annular positioning groove 351a of the handle portion 351 is aligned with the balls 16, and then the slide bushing 20 is released and pushed by the first spring 24 to its original position. In this way, the chisel replacement can be easily accomplished by hand without the use of tools.

Figure 1:
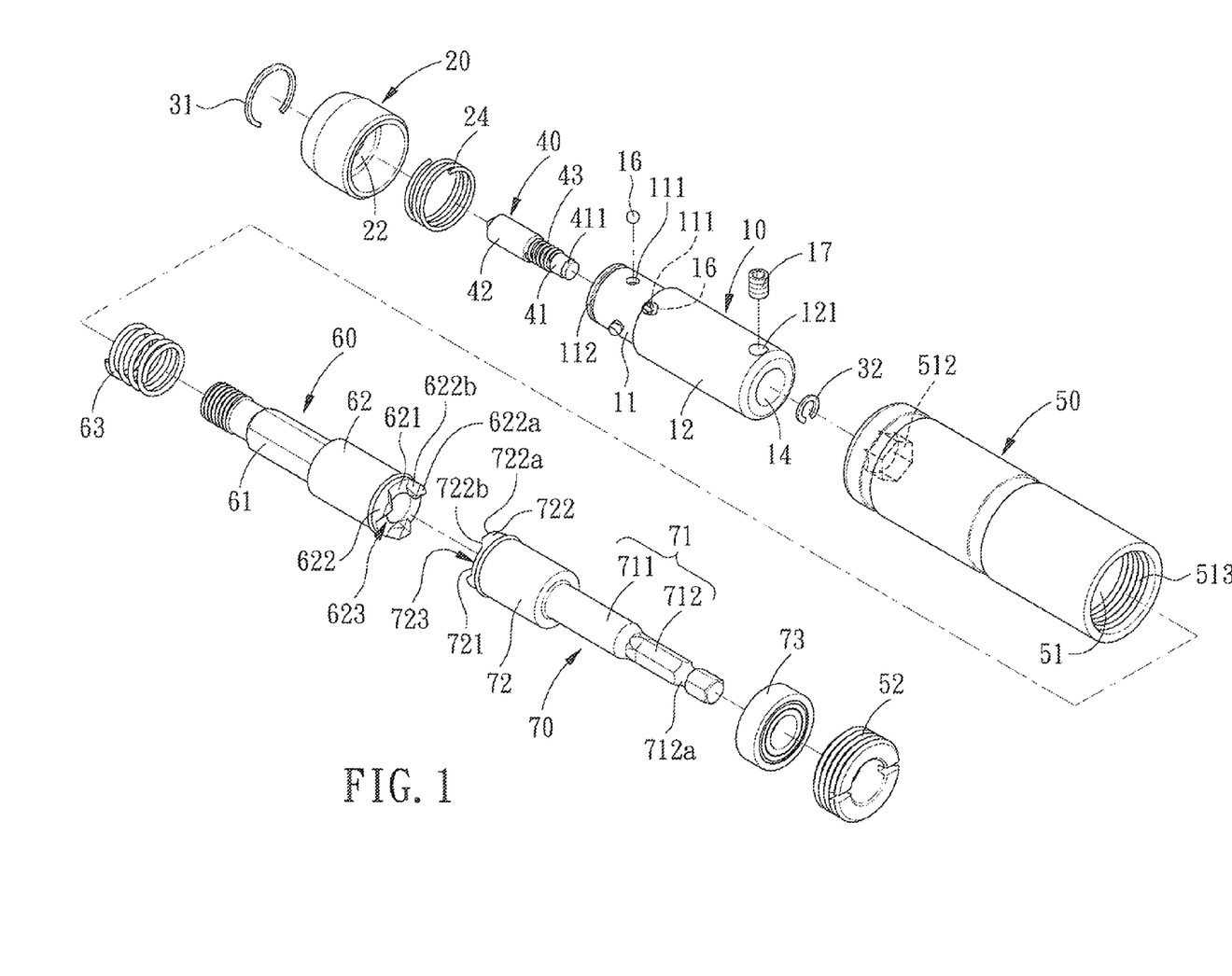
FIG. 1 is an exploded view of a chisel adapter in accordance with the present invention.
Figure 2:
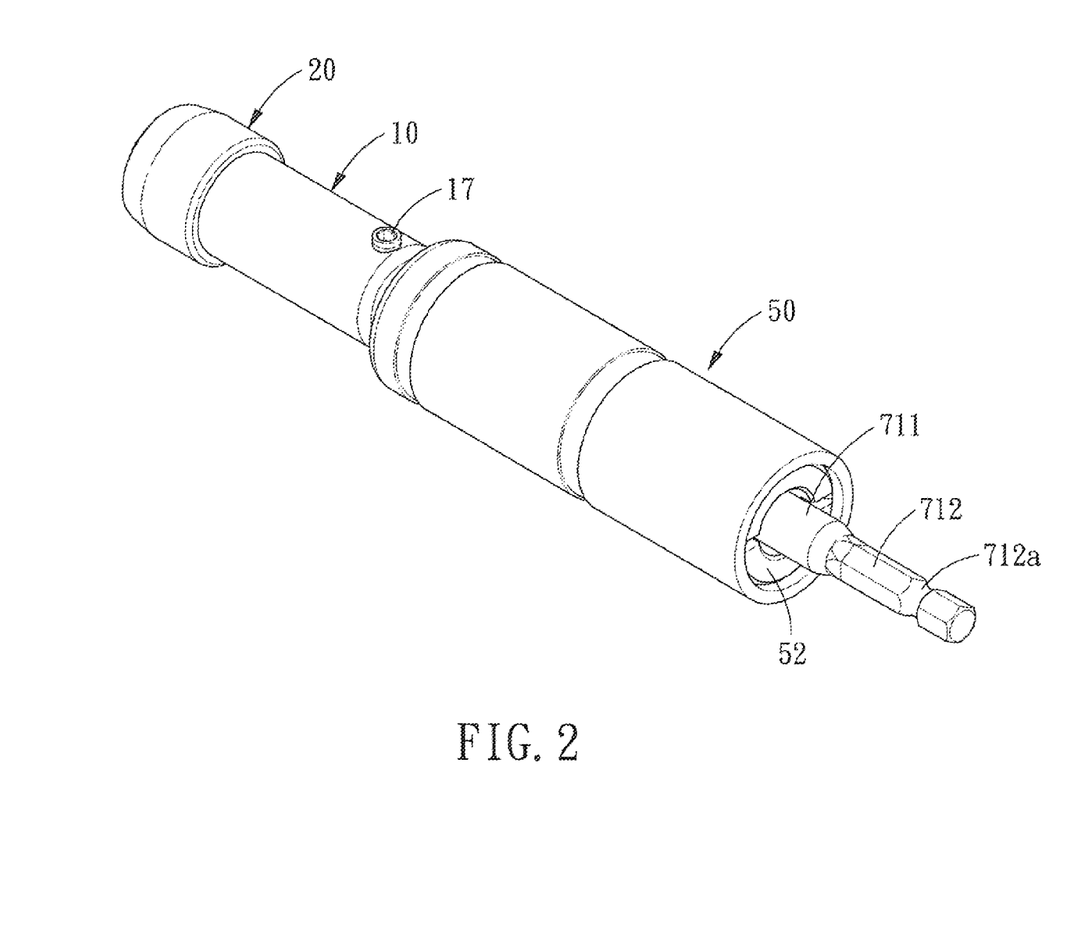
FIG. 2 is a perspective view of the chisel adapter in accordance with the present invention.
Figure 3:
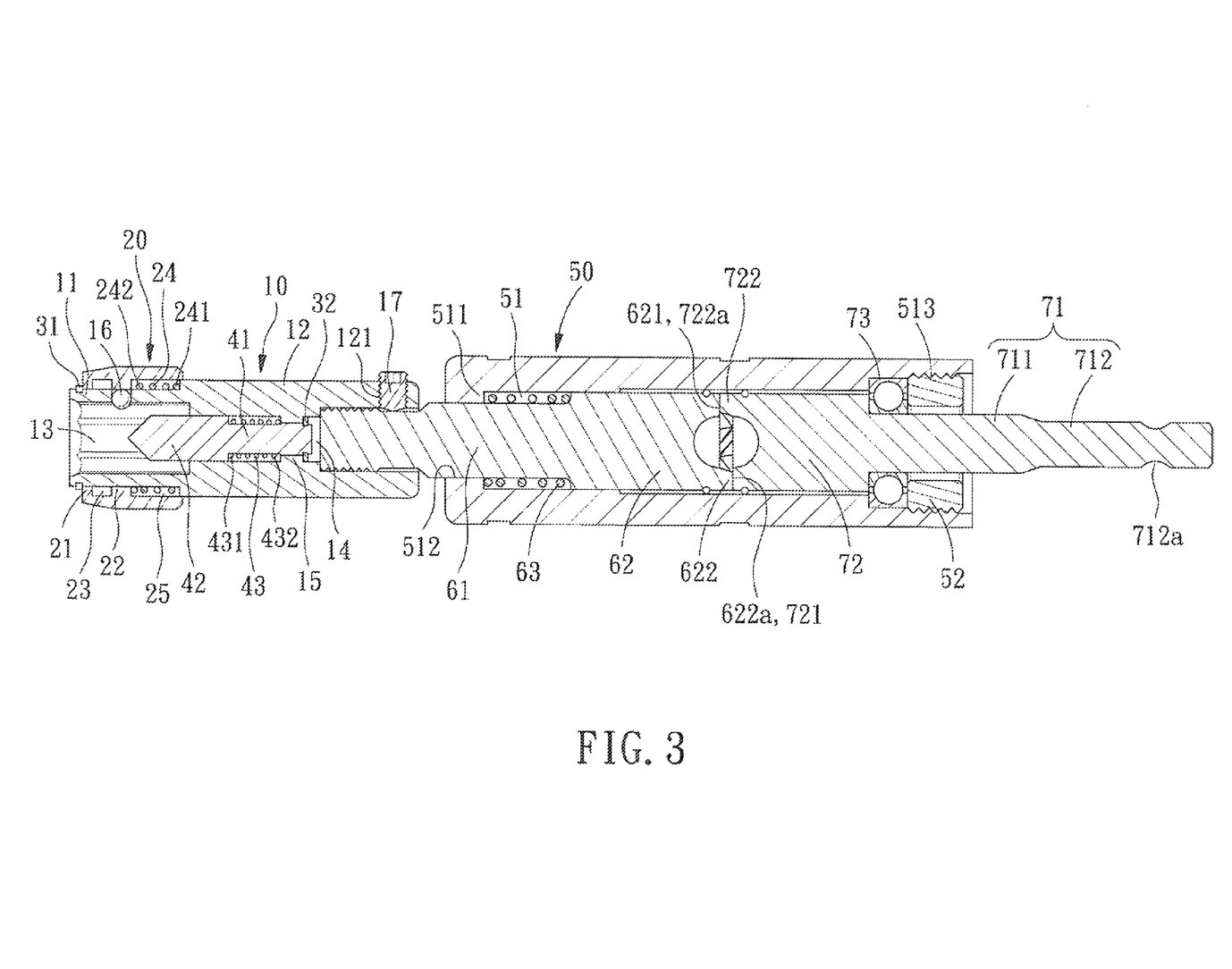
FIG. 3 is a cross sectional view of the chisel adapter in accordance with the present invention.
Figure 4:
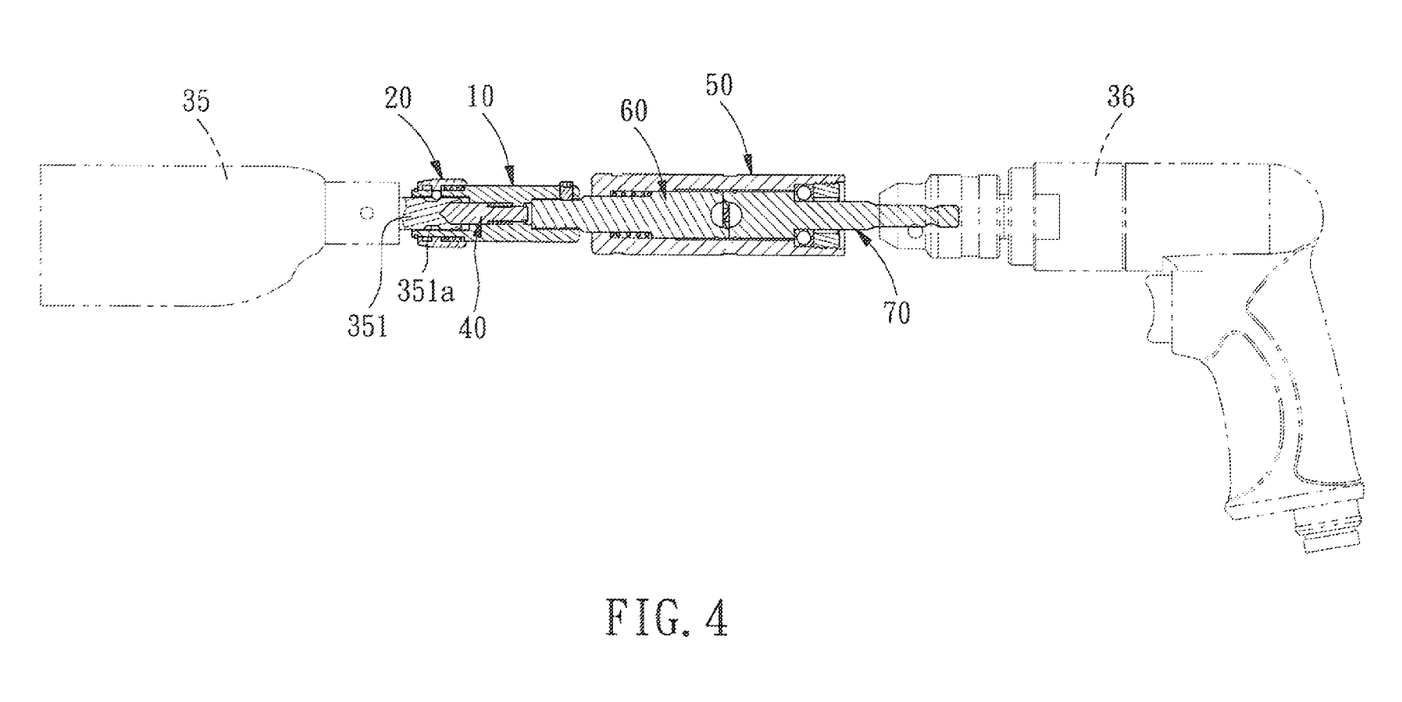
FIG. 4 is a cross sectional view showing that the chisel adapter in accordance with the present invention has two ends connected with a tool head and a drive tool, respectively.
Figure 7:
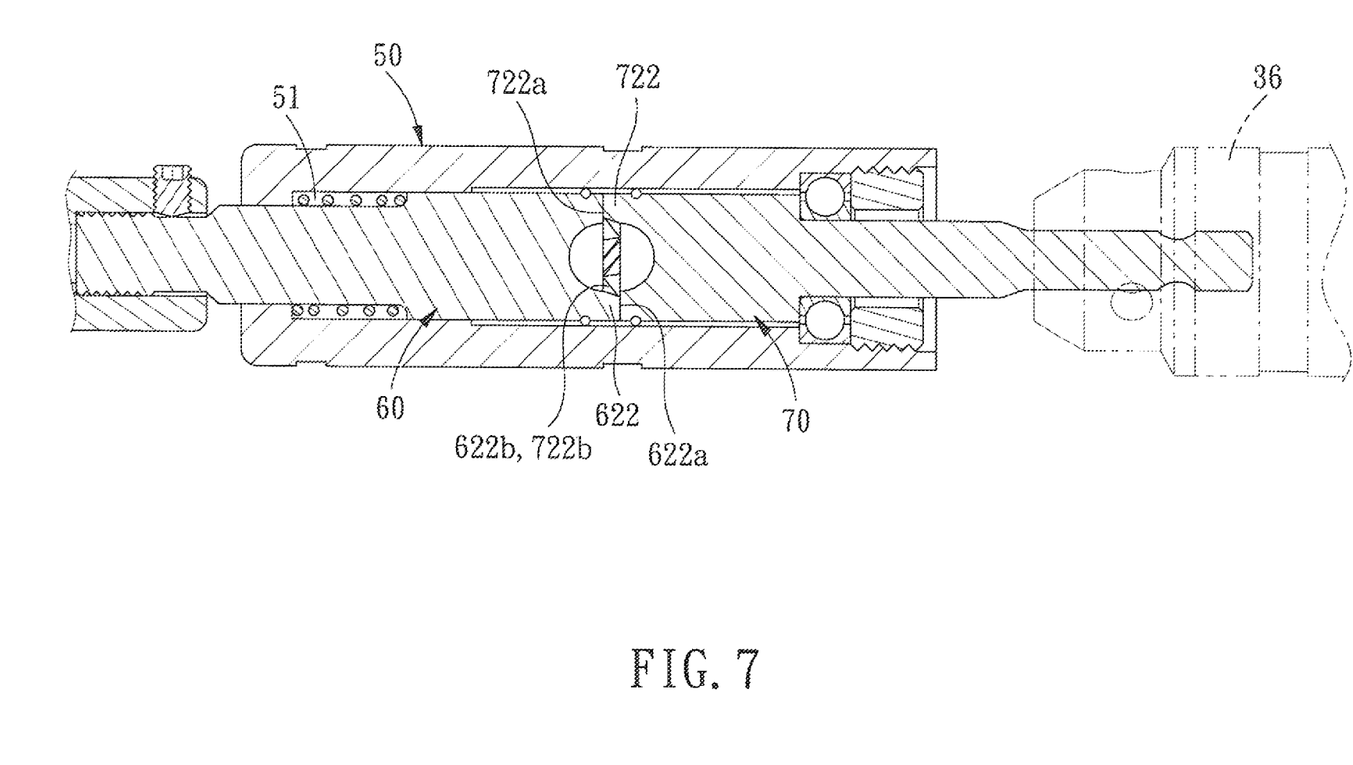
FIG. 7 is an illustrative view of the present invention showing that the first and second rods are engaged with each other.
Figure 8:
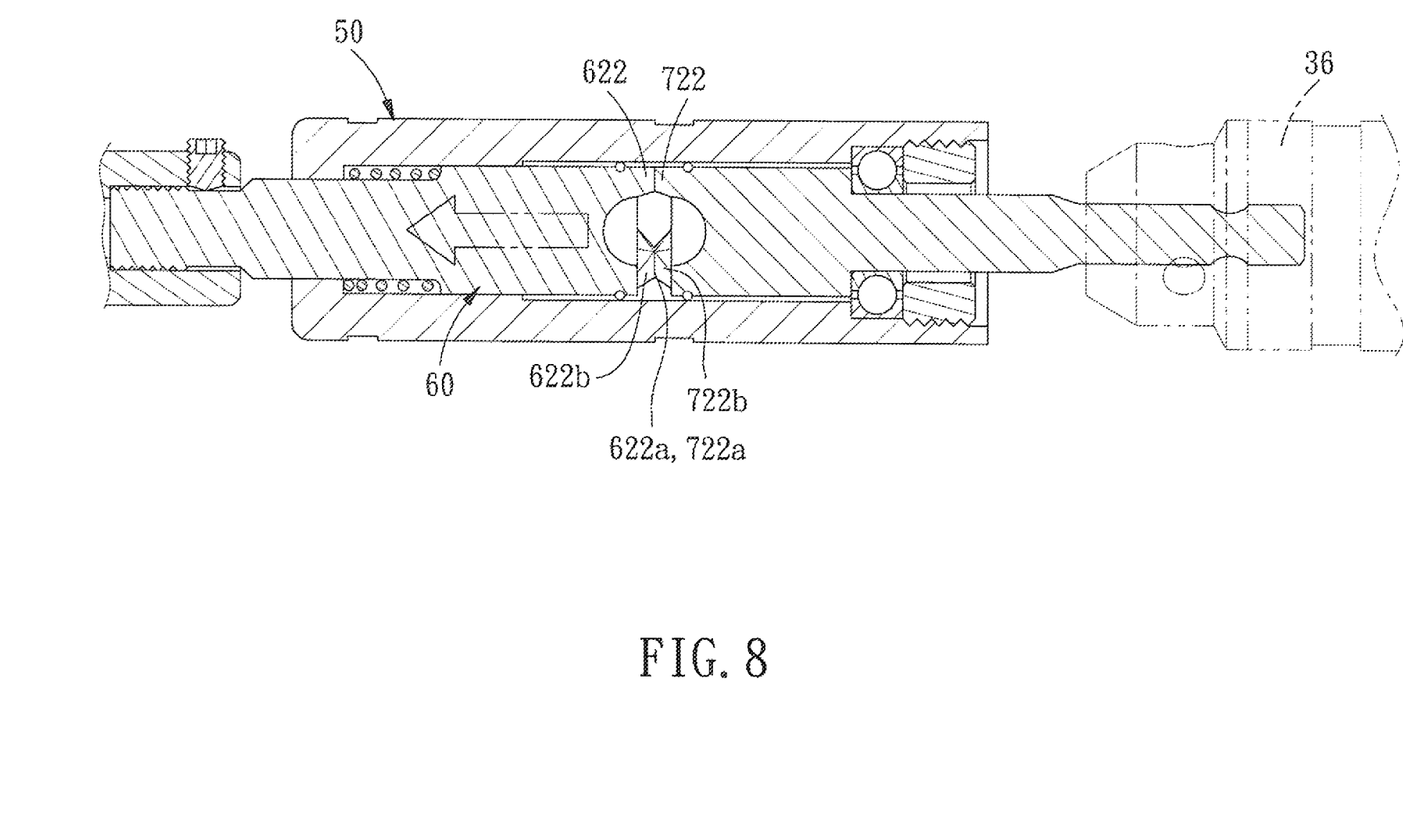
FIG. 8 is an illustrative view of the present invention showing that the second rod pushes the first rod to axially move within the first sleeve when it is rotated by the drive tool.

For a better understanding of the chiseling operation, reference should be made to FIGS. 1, 7 and 8. Since the first rod 60 is axially movably inserted in the cavity 51 of the second sleeve 50, the second rod 70 is pivotally disposed in the cavity 51, and the respective first teeth 622 of the first rod 60 and the second teeth 722 of the second rod 70 are engaged with one another, when the second rod 70 is clamped and rotated by the drive tool 36, the second guiding surfaces 722b of the second teeth 722 will slide against the first guiding surfaces 622b of the first teeth 622 of the first rod 60, making the second teeth 722 and the first teeth 622 change from the previous engagement state where the second teeth 722 are engaged side-by-side with the first teeth 622 into a push state in which the second abutting surfaces 722a of the second teeth 722 are pushed against the first abutting surfaces 622a of the first teeth 622, at this moment, the first rod 60 moves axially forward in the second sleeve 50. When the drive tool 36 continues rotating the second rod 70, the second teeth 722 and the first teeth 622 will change from the push state back into the engagement state in which the second teeth 722 are engaged in the first concave portions 623 between the first teeth 622 while the first teeth 622 are engaged in the second concave portions 723 between the second teeth 722, and at this moment, the first rod 60 moves axially backward in the second sleeve 50. In this way, the chisel 35 moves back and forth repeatedly to carry out chisel operation. The chisel adapter in accordance with the present invention is improved in applicability since it is applicable for use in common drive tools.

It is noted that, as shown in FIG. 5, after the chisel 35 is assembled, the balls 16 will be engaged in the annular positioning groove 351a of the handle portion 351, in addition to that, an engaging cavity 352a which is formed in the end surface of the handle portion 351 will also be engaged with and pushed against by the abutting portion 42 of the abutting member 40, and with the second spring 43, the abutting member 40 can provides a pushing force to the chisel 35, making the chisel 35 stably stay on the chisel adapter without disengaging therefrom during chiseling operation.

While we have shown and described various embodiments in accordance with the present invention, it is clear to those skilled in the art that further embodiments may be made without departing from the scope of the present invention.

What is claimed is:

1. A chisel adapter with both ends connected with a tool head and a drive tool, respectively, comprising:
    a first sleeve axially provided on its outer surface with a first annular portion and a second annular portion with a larger diameter than the first annular portion, the first sleeve being defined with a first engaging hole and a second engaging hole which are in communication with each other and penetrate through the first sleeve, and between the first and second engaging holes being formed an annular flange, the first annular portion being formed with three ball-receiving holes in communication with the first engaging hole, and in each of the ball-receiving holes being received a movable ball;
    a slide bushing being interiorly provided with a first annular flange, a second annular flange, and an annular groove formed between the first and second annular flanges, the slide bushing being movably mounted on the first annular portion of the first sleeve to define a space between the second annular flange and the second annular portion, and in the space being disposed a first spring, under normal conditions, the second annular flange being pushed against the respective balls to make them partially protrude out of the ball-receiving holes and into the first engaging hole, when the slide bushing slides to a position where the annular groove is aligned with the ball-receiving holes, the balls won't protrude into the first engaging hole any longer;
    a first fastener disposed in the first annular portion of the first sleeve and abutted against an outer surface of the first annular flange of the slide bushing;
    an abutting member including a rod portion and an abutting portion with a larger diameter than the rod portion, the abutting portion being inserted in the first engaging hole of the first sleeve, and a second spring being biased between the abutting portion and the annular flange of the first sleeve, the rod portion being inserted in the second engaging hole and partially extended therefrom in such a manner that a part of the rod portion extending out of the second engaging hole is provided with a second fastener which is abutted against the annular flange of the first sleeve;
    a second sleeve formed with a cavity and a hexagonal inserting hole at a bottom of the cavity;
    a first rod including a first body portion with a hexagonal cross section and a first head portion with a larger diameter than the first body portion, at an end surface of the first head portion being formed a plurality of first teeth, the first rod being axially movably inserted in the second sleeve in such a manner that between the first head portion and the bottom of the cavity is disposed a third spring, the first body portion being inserted in the inserting hole of the second sleeve and the second engaging hole of the first sleeve;
    a second rod including a second body portion and a second head portion, at an end surface of the second head portion being formed a plurality of second teeth, the second rod being pivotally disposed in the cavity of the second sleeve in such a manner that the second teeth of the second rod are engaged with the first teeth of the first rod, by rotating the second rod, its second teeth will axially push the first teeth of the first rod, making the first rod move axially back and forth in the second sleeve.

2. The chisel adapter as claimed in claim 1, wherein the second annular portion of the first sleeve is formed with a threaded hole which is in communication with the second engaging hole, and in the threaded hole is screwed a screw for fixing the first body portion of the first rod.

3. The chisel adapter as claimed in claim 1, wherein a threaded section is formed adjacent to an entrance of the cavity of the second sleeve, and a stop member is screwed with the threaded section.

4. The chisel adapter as claimed in claim 1, wherein the rod portion of the abutting member is annularly formed with a groove for engaging with a second fastener.

5. The chisel adapter as claimed in claim 1, wherein each first tooth of the first rod includes a first abutting surface and two first guiding surfaces which are connected to the first abutting surface and the end surface of the first head portion in an inclined manner, each second tooth of the second rod includes a second abutting surface and two second guiding surfaces which are connected to the second abutting surface and the end surface of the second head portion in an inclined manner, and the second guiding surfaces of the second rod are used to push against the first guiding surfaces of the first rod.

6. The chisel adapter as claimed in claim 1, wherein the second body portion of the second rod includes an inserting section with a hexagonal cross section, and the inserting section is formed with an engaging groove to be clamped by a driving tool.

7. The chisel adapter as claimed in claim 6, wherein a bearing is arranged between a connecting section of the second body portion of the second rod and a cavity of the second sleeve.

* * * * *